United States Patent [19]

Compton

[11] Patent Number: 5,033,932
[45] Date of Patent: Jul. 23, 1991

[54] HARVEST TRAILER WITH STICK REMOVER AND LOAD LEVELING STRUCTURE

[76] Inventor: Ira Compton, c/o Compton Enterprises, 2434 Dayton Rd., Chico, Calif. 95928

[21] Appl. No.: 529,591

[22] Filed: May 29, 1990

[51] Int. Cl.$^5$ .............................................. B60P 1/36
[52] U.S. Cl. ................................. 414/528; 209/681; 209/307; 209/261; 171/14; 460/86; 460/114; 460/144; 414/502
[58] Field of Search ............... 414/498, 451, 502, 503, 414/504, 505, 527, 528; 209/621, 622, 634, 661, 663, 665, 681, 261, 307, 308, 420, 421, 912, 923; 460/21, DIG. 2, 30 J; 171/123, 14, 126

[56] References Cited

U.S. PATENT DOCUMENTS

| | | | |
|---|---|---|---|
| 331,967 | 12/1885 | Hawley | 209/261 |
| 1,554,750 | 9/1925 | Mihaut | 209/307 |
| 1,835,327 | 12/1931 | Paradise | 460/114 X |
| 2,620,064 | 12/1952 | Thys | 209/307 X |
| 2,776,045 | 1/1957 | Heinrichs | 209/307 X |
| 3,107,475 | 10/1963 | Gustafson | 460/86 X |
| 3,769,988 | 11/1973 | Burenga | 414/502 X |
| 4,177,900 | 12/1979 | Kluthe | 209/261 X |
| 4,535,894 | 8/1985 | Shell | 209/681 X |
| 4,560,008 | 12/1985 | Carruthers | 171/14 |
| 4,576,538 | 3/1986 | Theurer et al. | 414/528 X |
| 4,844,683 | 7/1989 | Compton . | |

FOREIGN PATENT DOCUMENTS

| | | | |
|---|---|---|---|
| 447126 | 7/1927 | Fed. Rep. of Germany | 414/528 |
| 444819 | 2/1949 | Italy | 209/681 |
| 87138 | 5/1984 | Japan | 209/307 |
| 1278040 | 12/1986 | U.S.S.R. | 209/261 |
| 671448 | 5/1952 | United Kingdom | 460/144 |

OTHER PUBLICATIONS

Sales sheet from Weiss/McNair Inc., labeled part art (DE-Sticker Bank out Cart) no date.

*Primary Examiner*—Frank E. Werner

[57] ABSTRACT

A nut harvest trailer having a hopper with a rotatable loop of flexible screen affixed over the top of the hopper extending from the front to the rear thereof. A solid panel is affixed between an upper and lower layer of the loop of screen. The solid panel extends from the front of the hopper toward the rear thereof. The solid panel terminates to leave a narrow opening between the end of the solid panel and the rear of the hopper. The structure allows a mixture of nuts and small limbs to be deposited onto the upper layer of screen and solid panel at the front of the trailer. The mixture is then moved by the upper layer of screen on the solid panel toward the rear of the trailer where the nuts fall through the screen, through the narrow opening and into the hopper of the trailer. The sticks remain on the screen and are deposited off the rear of the trailer. The lower layer of the screen loop moves from the rear of the hopper toward the front thereof. When the nuts pile sufficiently high within the rear of the hopper, the lower layer of the rotating screen gently pushes the top of the pile of nuts toward the front of the hopper to evenly distribute the load therein.

3 Claims, 5 Drawing Sheets

HARVEST TRAILER WITH STICK REMOVER AND LOAD LEVELING STRUCTURE

BACKGROUND OF THE INVENTION

1. Field of the Invention

This invention relates to agricultural trailers towed behind crop harvesters to receive and carry the harvested crops. More particularly, this invention relates to a nut harvest trailer having an improved stick and debris removing structure positioned above the hopper of the trailer, and an improved load distributing structure within the hopper.

2. Description of the Prior Art

Harvest trailers of one structure or another have been towed behind nut harvesters to receive and transport the harvested nuts for many years now. Nut harvesters pick up nuts which are usually in windrows on the ground in orchards. These nuts may be almonds, walnuts, pistachios and the like. The nuts are first knocked from the trees using powerful tree shaking machines. During the shaking process, many small tree limbs are knocked to the ground along with the nuts. The next step in the process is to have a crew of workers walk through the orchard and pick up the majority of the sticks and remove them from the orchard. After the sticks have been removed, the nuts are then swept into windrows using sweeping machines. The manual removal of the sticks from the orchard is labor intensive and therefor costly, and the more thorough the workers must be, the more costly the process.

Most nut harvesters and sweepers have little problem dealing with small sticks, although it appears as though larger branches will always need to be manually picked up and removed from the orchard. Small sticks which are overlooked by the stick removal crew usually are picked up by the nut harvester with the nuts, and deposited into the harvester trailer. This mixture of nuts and sticks, being by far mostly nuts, is then transported to a nut drying and processing plant where the mixture is deposited into additional nut processing equipment. The sticks are difficult at best to remove from the nuts with the equipment of most nut processing facilities. The sticks become dry and brittle, begin to break into smaller pieces during processing, clog up the processing machines, and are difficult to remove from the nuts to a degree to allow the nuts to be packaged for sale.

In more recent years, some harvest trailers have been equipped with rotating stick removal screens affixed over the top of the hopper of the trailer. These rotating screens are sized to cover the area where the nuts fall from the off load elevator of the nut harvester into the harvest trailer. The screen extends from the front of the trailer to the rear thereof. The openings of the screen are sized sufficiently large to allow nuts to fall through the screen and into the front of the trailer hopper. The openings of the screen are further sized to be sufficiently small enough to maintain most sticks on the top layer of the screen. This is possible largely in part due to the length of the sticks and the fact that the sticks generally land, or in up laying horizontally disposed on the top layer of the screen due to vibration and settling on the moving screen. The rotating screen carries the sticks from the front of the trailer where they are received from the off load elevator of the nut harvester, to the rear of the trailer where they are dumped off the back end and onto the ground behind the harvest trailer.

The dispensing of the nuts from the nut harvester is into the front of the harvest trailer under tow. This single location dumping into the hopper makes for an uneven distribution of the nuts in the trailer, which would lead to having to empty the trailer prior to it being completely full if it were not for the use of some kind of structuring to more evenly distribute the nuts in the trailer hopper. The nuts fall through the rotating screen almost exclusively at the point where they are deposited.

Past art harvest trailers with stick removal screens are normally equipped with two generally horizontally disposed screw augers in the bottom of the hopper to move the nuts from the front of the trailer hopper to the back thereof to distribute the load more evenly. The screw augers are normally powered by hydraulic motors which in turn are powered by the hydraulic pumping station common on modern nut harvesters and tractors. The hydraulic motors used to drive the screw augers consume power, leading to greater fuel consumption by the nut harvester. These load distributing screw augers rotate continuously while the harvest trailer is being loaded in the orchard, and it is not long into the loading process before the screw augers are completely covered with nuts. Rotating screw augers covered with nuts have a tendency to break and otherwise damage the crop, which is one problem addressed by my invention.

It should also be noted that harvest trailers are generally always equipped with a structure which allows removal of the nuts from the hopper of the trailer. Three types of nut unloading structures are currently in wide use in nut harvest trailers. The first type of hopper unload structure commonly in use are openable doors on the bottom of the hopper as included as a part of my bulk harvest trailer with power assist, disclosed in U.S. Pat. No. 4,844,683 issued July 4, 1989. The openable doors on the bottom of the trailer hopper allow dumping the nuts into a recessed pit at a processing plant. The second type of common hopper unload structure is that of a horizontally disposed conveyor belt in the bottom interior of the hopper, used in combination with an upwardly angled unload conveyor belt elevator at the rear of the hopper. This double conveyor belt unload system is normally used to unload the nuts from the hopper of the harvest trailer into the hopper of a second usually larger harvest trailer. The third type of harvest trailer unload structure uses a hinged tailgate and a tiltable hopper to allow dumping the crop from the hopper in a method similar to that of a dump truck.

Although the harvest trailer of this disclosure is illustrated and described as the type of trailer having the double conveyor belt unload system, the invention of this disclosure may be used with virtually any type of hopper unload structure.

SUMMARY OF THE INVENTION

In practicing my invention, I have structured a towable harvest trailer having a stick removal screen, and have eliminated the use of the nut damaging screw augers common to past art harvest trailers. Through the elimination of the screw augers, my harvest trailer is also less costly to build and maintain, and further requires less power to operate. In order to provide for evenly distributing the load within the hopper of my trailer, I have arranged my stick removing screen in a manner to move the nuts from where they are deposited into one end of the hopper toward the opposite end of the hopper without damaging any nuts.

My towable nut harvest trailer has a hopper with a continuously rotating loop of stick removal screen affixed over the top of the hopper extending from the front to the rear thereof. A solid panel is affixed between an upper and lower layer of the loop of screen. The solid panel extends from the front of the hopper toward the rear thereof. The solid panel terminates to leave a narrow opening between the end of the solid panel and the rear of the hopper. The structure allows a mixture of nuts and small limbs to be deposited onto the upper layer of screen and solid panel at the front of the trailer whereat the mixture is moved by the upper layer of moving screen, with the mixture riding on both the solid panel and upper layer of screen toward the rear of the trailer where the nuts fall through both the upper and lower layer of screen, through the narrow opening between the end of the solid panel and the rear of the hopper, and into the hopper of the harvest trailer. The sticks remain on the screen, laying horizontally disposed, and are dumped off the rear of the trailer. The lower layer of rotating screen loop is positioned within the upper portion of the hopper. Movement of the lower layer of screen is from the rear of the hopper toward the front thereof. When the nuts pile sufficiently high at the rear of the hopper, the lower layer of the rotating screen gently pushes the top of the pile of nuts toward the front of the hopper to evenly distribute the load therein.

Therefore a primary object of my invention is to provide a harvest trailer having stick removing structure and a loading distributing structure which is non-damaging to nuts.

It is a further object of my invention to provide the above in a harvest trailer which consumes less power to operate, and therefore slows the consumption gas or diesel in the towing vehicle.

It is a further object of my invention to provide the above in a harvest trailer which is less costly to build and maintain.

Other objects and advantages of my harvest trailer will be recognised by those skilled in the art with a further reading of this disclosure coupled with an examination of my attached drawings illustrating a preferred embodiment of my invention for example.

DESCRIPTION OF THE PREFERRED EMBODIMENT

Figure 1:
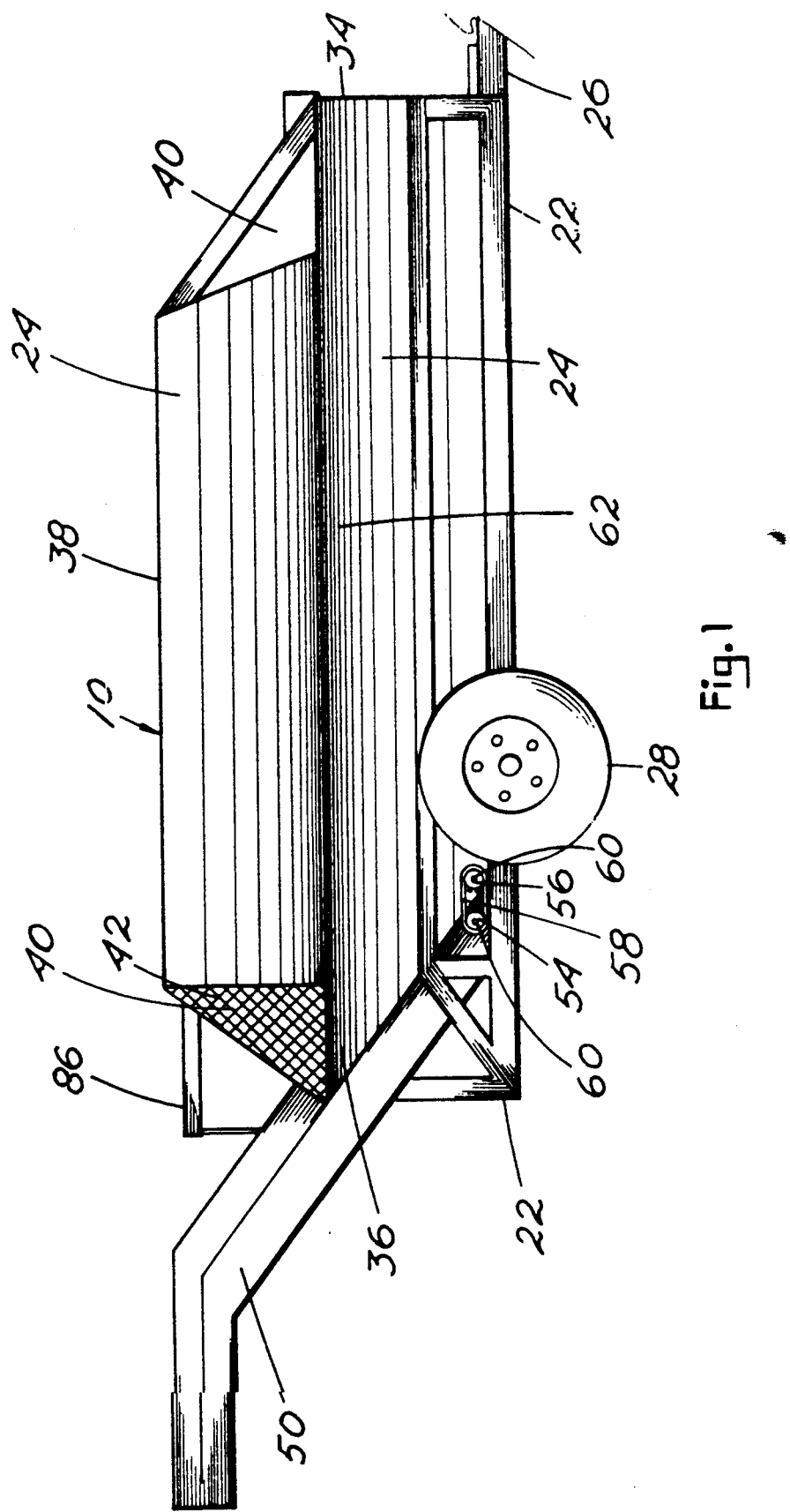
FIG. 1 is a right side view of my harvest trailer. The left side of the harvest trailer appears generally the same as the right side.

Referring now to the drawings in general where my harvest trailer with novel stick removal and load leveling structure is shown in various views and generally designated as harvest trailer 10. My harvest trailer 10 necessarily shares many common structures with similar past art harvest trailers which also use stick removal screens. The novel feature, and improvement incorporated into my harvest trailer 10 is the use and placement of solid panel 12 between the upper 14 and lower layers 16 of the continuous loop of stick removal screen 18. Through the installation and placement of solid panel 12, I have eliminated the screw augers and the problems associated with using screw augers common to past art harvest trailers for distributing the load evenly within the hopper. In my drawings where movement is being depicted, movement directional arrows 20 are shown to assist in understanding the structuring of harvest trailer 10.

Figure 6:
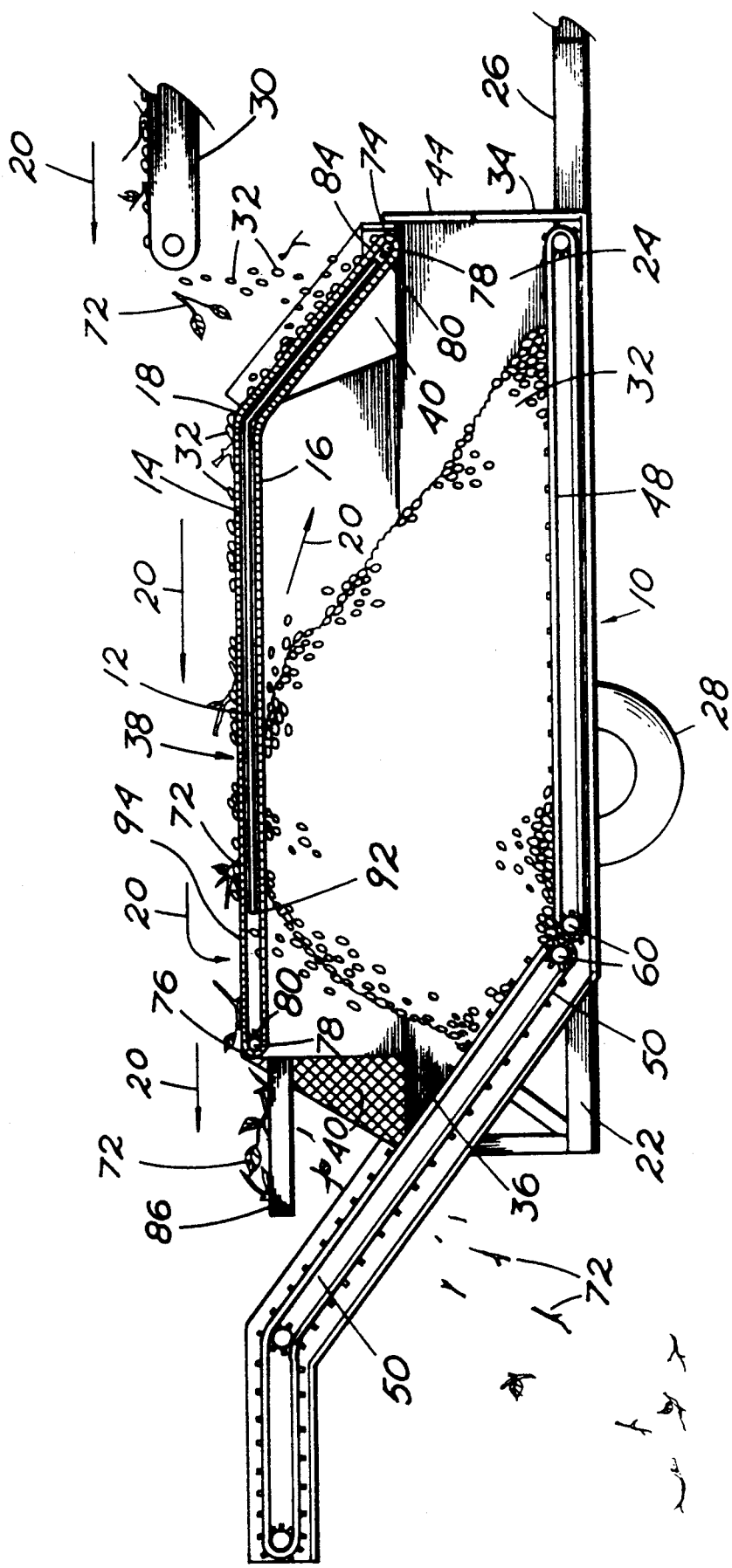
FIG. 6 is a sectioned view of my harvest trailer depicting the positions and operations of some of the various components. Nuts are shown being moved by the lower layer of screen from the top of the pile at the rear of the hopper toward the front of the hopper to more evenly distribute the load.

Common features between similar past art harvest trailers and my harvest trailer 10 include a generally rectangular steel support main frame 22 with attached hopper 24, a tow hitch 26 attached at a front end of frame 22, and at least two wheels 28 rotatably affixed to main frame 22 to adapt harvest trailer 10 for towing by a nut harvester or tractor. Although a complete nut harvester is not fully shown in the drawings, being well known to those skilled in the art, the discharge end of a nut harvester unload elevator 30 is shown in FIG. 6 placed over the hopper front end where nuts 32 are typically deposited onto past art harvest trailers and also my harvest trailer 10.

Figure 2:
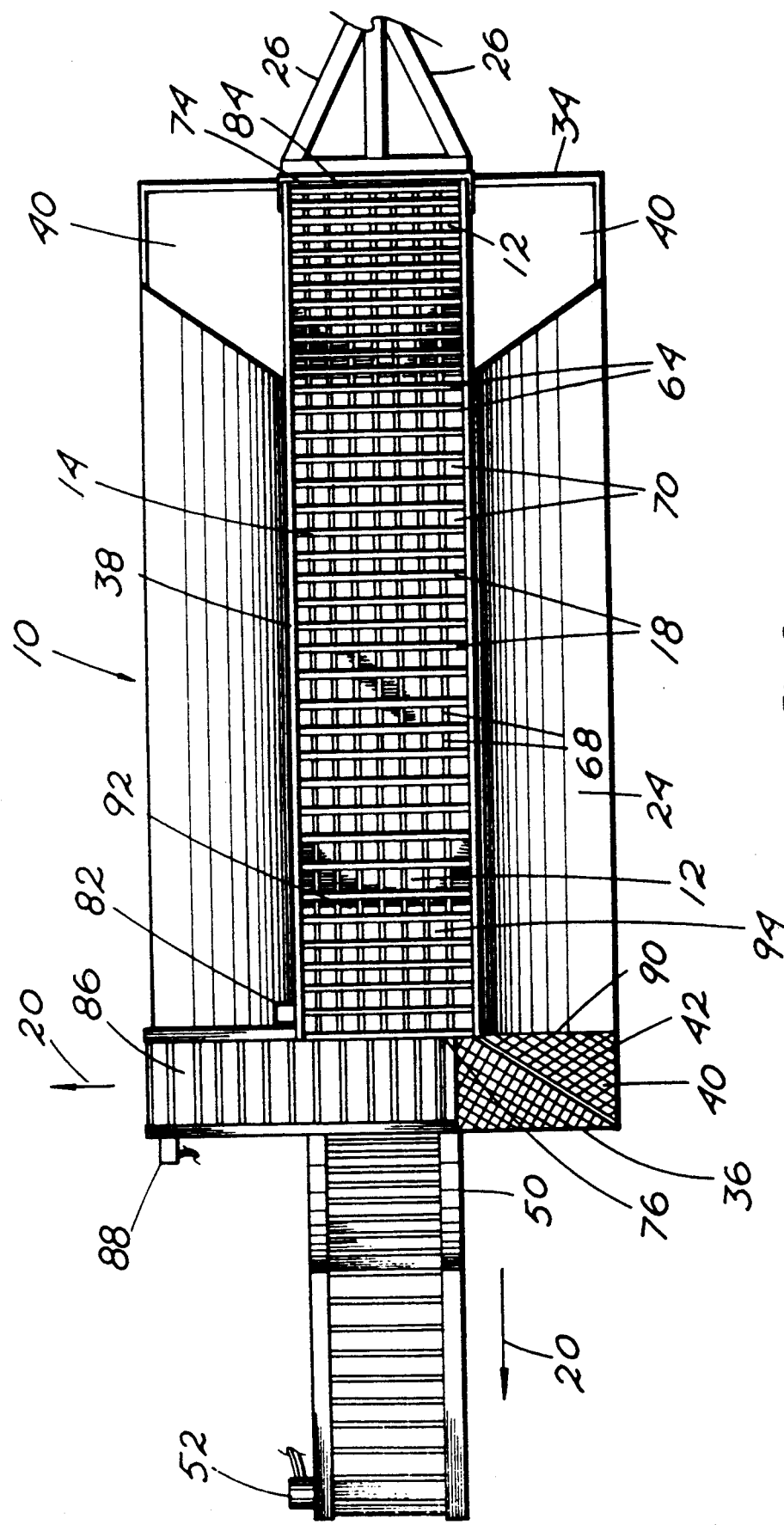
FIG. 2 is a top view of my harvest trailer.
Figure 3:
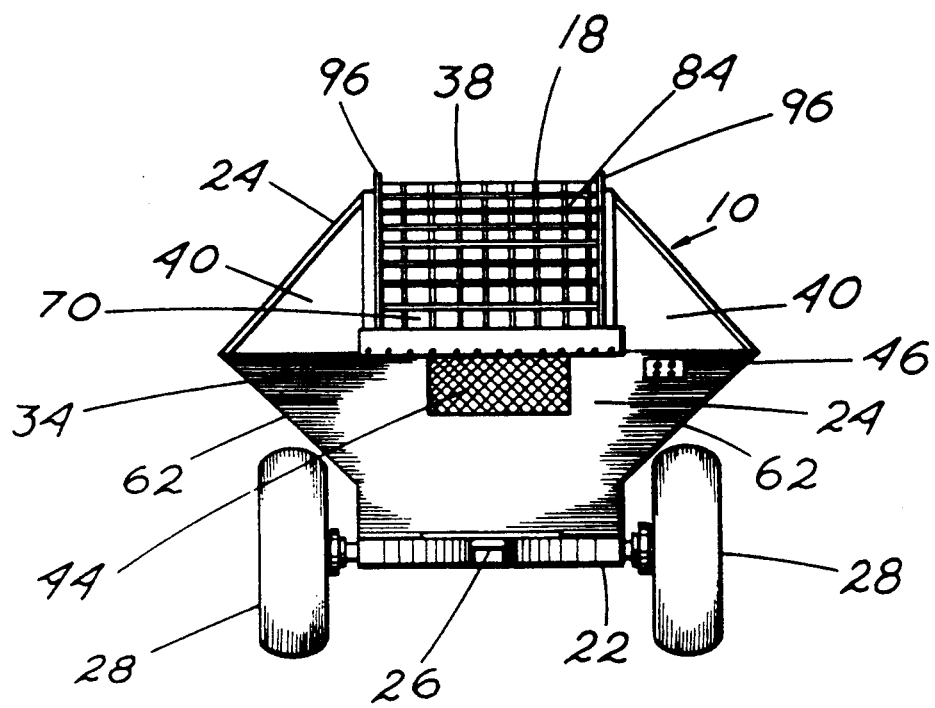
FIG. 3 is a front end view of my harvest trailer.

Referring now more particularly to drawing FIG. 1 through 3 where box-like hopper 24 is shown attached to main frame 22. Hopper 24 is structured to receive nuts 32 from harvester unload elevator 30 and carry nuts 32 as harvest trailer 10 is towed through an orchard by a nut harvester in the process of picking up nuts 32. Those skilled in the art realize that harvest trailer hoppers can be made in a variety of shapes, and it should be noted hopper shapes and structures other than what is shown in my drawings and herein described may be used with the invention of this disclosed.

My hopper 24 shown in the drawings is generally hexagonally shaped as seen in FIG. 3, having a hopper front end 34, an oppositely disposed hopper rear end 36, and a hopper top end 38. The particular hopper 24 shown in my drawings is of a generally covered type, having larger hauling capacity and also structured to prevent small sticks knocked from low hanging tree limbs from falling into hopper 24 as harvest trailer 10 is towed through an orchard. My hopper 24 has four open corners 40. Two rear corners 40 are covered with see through mesh 42, and two front open corners 40 are left completely open. The open corners allow viewing into the interior of hopper 24. The front end 34 of hopper 24 best in FIG. 3, has a centrally placed load viewing screen 44 to allow viewing and detection of a full load of nuts 32 in hopper 24 by an operator of a nut harvester.

Also shown in FIG. 3 are hydraulic connection ports 46 common to many harvest trailers. Hydraulic connection ports 46 are for the removable connection of flexible hydraulic fluid lines pressured by the hydraulic pumping system common to nut harvesters. The hydraulic connection ports 46 are connected to hydraulic fluid lines on harvest trailer 10 which lead to the various hydraulic motors on trailer 10 to power the various movable components thereon.

Also common to my harvest trailer 10 and to many similar past art harvest trailers is a double conveyor hopper unload structure shown best in FIG. 6. The typical double conveyor hopper unload structure is comprised of a horizontally disposed conveyor 48 located in the bottom interior of hopper 24, and an angled conveyor 50 centrally located at rear end 36 of harvest trailer 10. Angled conveyor 50 is aligned at the lower end thereof within hopper 24 with the rearward end of horizontal conveyor 48. From its position within hopper 24, angled conveyor 50 extends upward and rearward exiting hopper 24 as depicted in FIG. 1, 2, and 6. Hydraulic motor 52 connected to the distal end of angled conveyor 50 is arranged to rotate angled conveyor 50. At the lower end of angled conveyor 50 is a sprocket 54 driven my movement of angled conveyor 50. Affixed to the rearward end of horizontal conveyor 48 adjacent to sprocket 54 is a second sprocket 56. A short drive chain 58 connects sprockets 54 and 56 together. Both sprockets 54 and 56 are supported by bearing supported rotatably attached axles or rods 60, and sprockets 54 and 56 are normally positioned exteriorly of hopper 24 as shown in FIG. 1. When hydraulic motor 52 rotates angled conveyor 50, horizontal conveyor 48 is also rotated by way of sprockets 54 and 56 and drive chain 58. Horizontal conveyor 48 moves nuts 32 within hopper 24 toward the lower end of angled conveyor 50 which carries nuts 32 up and out of hopper 24 to be deposited into another larger trailer or nut processing equipment. This double conveyor unload structure is only operated to unload a full hopper 24, and is well known to those skilled in the art. The hexagonal shape of my hopper 24, having inwardly sloped lower side panels 62 helps guide nuts 32 onto horizontal conveyor 48 for complete hopper 24 unloading.

Figure 4:
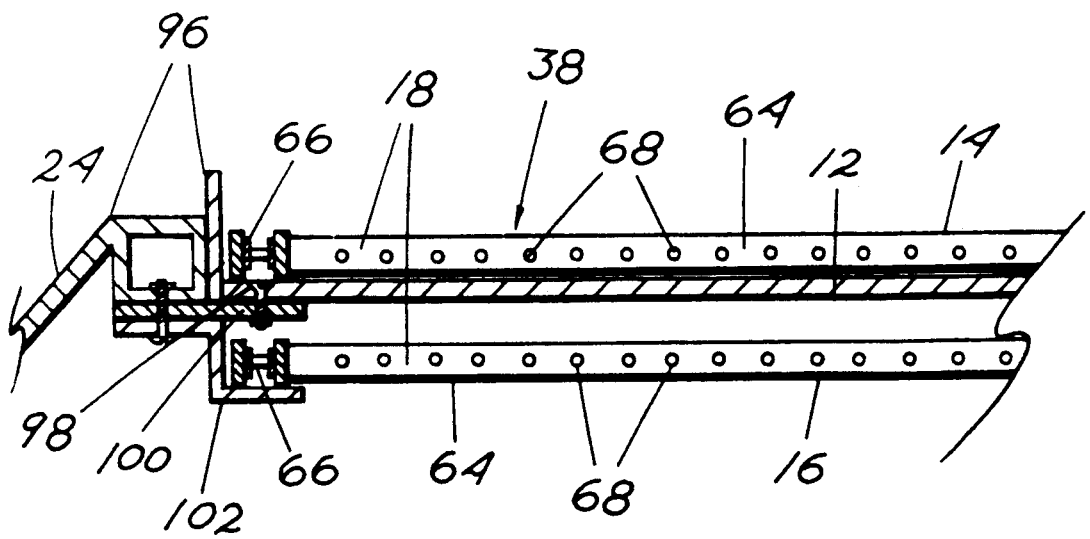
FIG. 4 is a partial sectional view of the upper and lower layers of screen illustrating one method of attaching the solid panel to an upper section of the hopper of the trailer. Further illustrated is the relative position of the solid panel to the continuous loop of stick removal screen.
Figure 5:
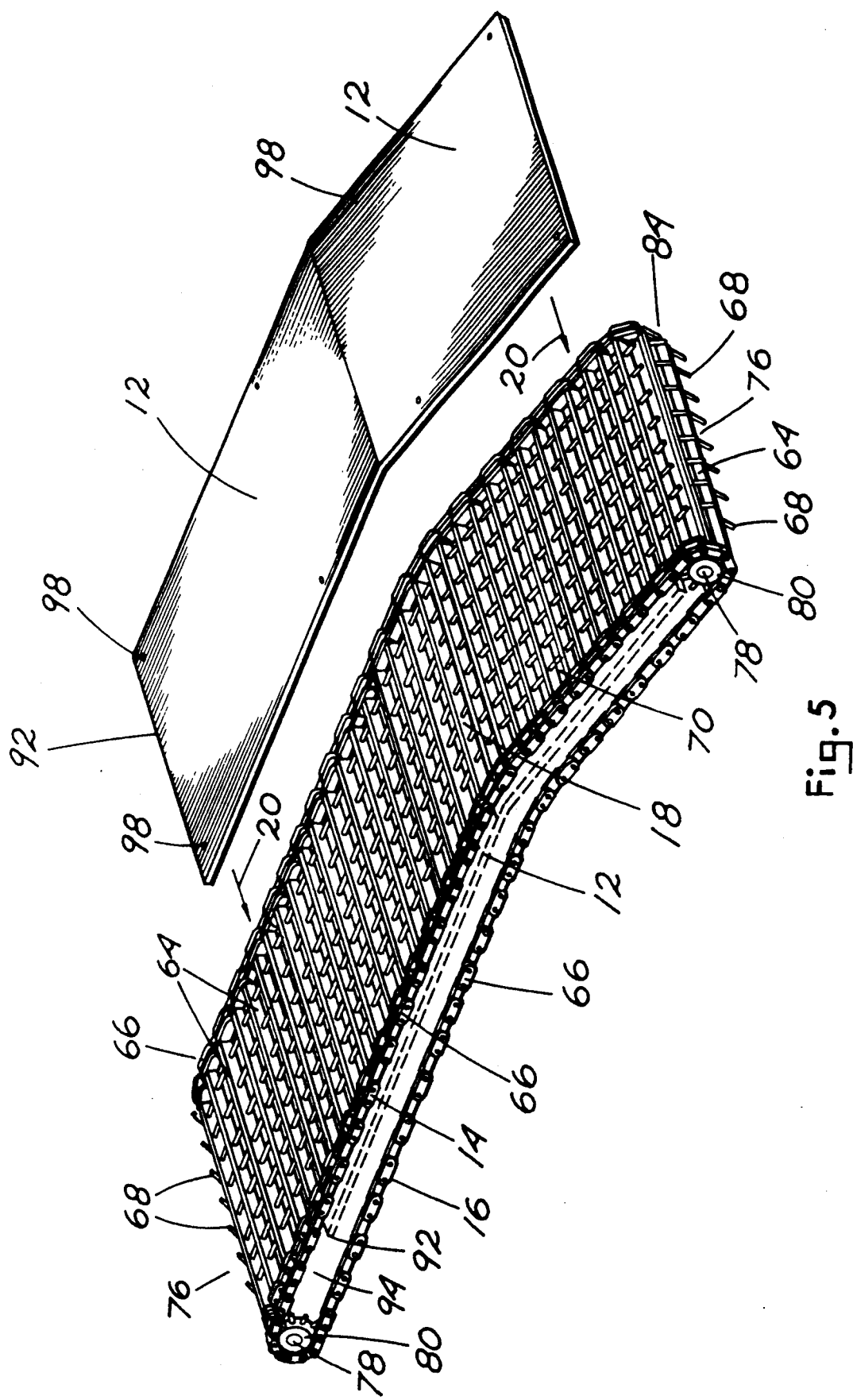
FIG. 5 illustrates the continuous loop of stick removal screen with the solid panel off to one side ready for insertion between the upper and lower layers of the screen. Illustrated with dotted lines is the solid panel inserted between the layers of the screen. The inserted solid panel is shown terminating prior to reaching the rearward end of the continuous loop of screen in the far left of the drawing.

The structure and placement of a typical loop of stick removal screen 18 common to my harvest trailer 10 and similar past art harvest trailers can be best seen in FIG. 2 through 6. Stick removal screen 18 is structured of a plurality of metal cross bars 64 spanning between and welded to two continuous and oppositely disposed loops of drive chain 66 best seen in FIG. 5. Welded to each cross bar 64, and generally spanning transversely between cross bars 64 is a plurality of short metal rods 68. Short metal rods 68 are welded only on one end thereof as may best be seen in FIG. 5. The welding of short metal rods 68 on only one end thereof allows for flexibility of stick removal screen 18. The unattached end of each short metal rod 68 generally reaches the next cross bar 64, but is not affixed thereto. The spacing between cross bars 64 and short metal rods 68 forms a screen having apertures 70 sufficiently large to allow nuts 32 to fall through the screen, while apertures 70 are sufficiently small to cause and allow small tree limbs and sticks 72 to lay horizontally disposed on upper layer 14 of stick removal screen 18. Stick removal screen 18 is folded in two places designated front fold 74 and rear fold 76 to form the continuous loop of flexible stick removal screen 18 as shown in FIG. 5 and 6. The continuous loop of stick removal screen 18 provides the upper layer 14 of screen 18 above the lower layer 16 of screen 18. As with past art harvest trailers, the continuous loop of screen 18 is rotatably attached over top end 38 of hopper 24 with the use of bearing supported rotatably affixed axles or rods 78 affixed to, and extending across the top edges of hopper top end 38. The rotatable rods 78 are affixed with sprockets 80 on each end thereof which mesh with and support the two side loops of drive chain 66 of stick removal screen 18. One rotatable rod 78 is affixed with a hydraulic motor 82 shown in FIG. 2 to rotate loop of screen 18. At least one rotatable rod 78 with sprockets 80 is affixed at each fold 74 and 76 of stick removal screen 18 as shown in FIG. 6.

In drawing FIG. 2 and 6, stick removal screen 18 is shown centrally placed over hopper top end 38. Front end 84 of stick removal screen 18 at front fold 74 is positioned at front end 34 of hopper 24 as closely as possible and still leave sufficient clearance to allow movement of screen 18 without striking hopper 24. Stick removal screen 18 extends from front end 34 of hopper 24 toward hopper rear end 36. In my preferred embodiment of harvest trailer 10, and in some past art harvest trailers, stick removal screen 18 terminates prior to hopper rear end 36, terminating slightly above and in proper position to unload sticks 72 onto a horizontally disposed stick unload conveyor 86. Stick unload conveyor 86 is powered by a hydraulic motor 88 and serves the purpose of catching sticks 72 from stick removal screen 18 and dumping the sticks 72 off to one side of harvest trailer 10 onto the ground. Stick unload conveyor 86 keeps sticks 72 from falling onto angled conveyor 50. It should be noted that if another type of hopper unload structure other than the double conveyor structure described above is used with harvest trailer 10, such as bottom unload doors for example, stick unload conveyor 86 might not be used at all, and stick removal screen 18 would extend completely to hopper rear end 36 and dump sticks 72 directly off the end of harvest trailer 10 onto the ground. In FIG. 2, the number 90 is used to designate a hypothetical hopper rear end 36 and a stick 72 and debris off load position to depict the prior described arrangement of stick removal screen 18 extending to the rearward edge of the hopper 24. In any case, stick removal screen 18 must extend to a position where sticks 72 and other debris thereon may be off loaded from screen 18 to make room for additional sticks 72. Those skilled in the art recognize this is well known.

The lower layer 16 of stick removal screen 18 is positioned within the upper interior of hopper 24 as can be seen in FIG. 6. The direction of rotation of stick removal screen 18 on harvest trailer 10, as determined by the direction of rotation of hydraulic motor 82, is with the upper layer 14 moving from front end 34 of hopper 24 toward rear end 36 of hopper 24 simultaneously, since it is one loop of screen, with lower layer 16 of screen 18 moving from rear end 36 of hopper 24 toward front end 34 of hopper 24.

With past art harvest trailers which have stick removal screens, the top end of the hopper is left open from the front end to the rear end of the hopper, with this opening in the top of the hopper covered with the rotating stick removal screen. Past art structuring appears quite similar to the stick removal screen 18 arrangement of my harvest trailer 10 as may best be seen in drawing FIG. 2. However, with close examination of my drawings, it may be seen I have affixed solid panel 12 underneath the upper layer 14 of screen 18, and above lower layer 16 of screen 18. An examination of FIG. 3, 4 and 5 will also help understand the placement of solid panel 12. Solid panel 12 extends from adjacent hopper front end 34 and front fold 74 of stick removal screen 18, spanning centrally between each top sidewall edge 96 at hopper top end 18 and extending toward hopper rear end 36. The rearward terminal end of solid panel 12 is designated panel terminal end 92. Solid panel 12 generally closes the open top end 38 of hopper 24 which is left open in past art harvest trailers. Panel terminal end 92 shown in FIG. 2, 5 and 6 leaves a receiver opening 94 between solid panel 12 and the rear end 36 of hopper 24. Stick removal screen 18 continues further toward rear end 36 of harvest trailer 10 to dispose of any sticks 72 off of the trailer 10.

FIG. 4 is a partial sectional view of one side edge of stick removal screen 18 and solid panel 12 attached and adjacent the upper top sidewall edge 96 of hopper 24 as the structuring would appear looking from the front to the rear of harvest trailer 10. The opposite side which is not shown would appear substantially the same. In FIG. 4, solid panel 12 is shown bolted through bolt holes 98 therein to an attachment flange 100 affixed to the top sidewall edge 96 of hopper 24. Upper layer 14 of stick removal screen 18 and drive chain 66 are shown resting on the top surface of solid panel 12. The drive chain 66 of lower layer 16 of stick removal screen 18 is shown supported by a Z-shaped 102 flange affixed to top sidewall edge 96 of hopper 24. Solid panel 12 may be made of metal or plastic.

In most of the drawings the front end 34 of hopper 24 and stick removal screen 18 is shown at a slope before leveling off at top end 38 of hopper 24. This is primarily to allow larger hauling capacity within hopper 24 while at the same time providing physical clearance between hopper 24 and the discharge end of a nut harvester unload elevator 30 particularly during sharp turns in an orchard. In FIG. 6 there is plenty of clearance between the discharge end of a nut harvester unload elevator 30 and hopper 24, however, this is not always the case depending on the nut harvester used.

Referring now mainly to FIG. 6, in use, tow hitch 26 of harvest trailer 10 is attached to a nut harvester and flexible hydraulic fluid feed lines from the nut harvester are attached to hydraulic ports 46. This stage of harvesting begins with the nut harvester picking nuts 32 and sticks 72 up from the ground in an orchard. With the stick removal screen 18 rotating, the nuts 32 and sticks 72 are then dumped from the discharge end of the nut harvester unload elevator 30 onto the front end 84 of stick removal screen 18. The mixture of nuts 32 and sticks 72 cannot enter hopper 24 due to the placement of solid panel 12. The upper layer 14 of stick removal screen 18 drags nuts 32 and sticks 72 toward the rear end 36 of the hopper 24. When the mixture is moved beyond panel terminal end 92 of solid panel 12, nuts 32 fall through both the upper 14 and lower 16 layers of the screen 18 and receiver opening 94 into hopper 24. Sticks 72 and or other pieces of debris to large or long to fall through screen 18 remain on top of the upper layer 14 of screen 18 to be dump onto either stick unload conveyor 86 or directly off rear end 36 of the hopper 24 for disposition onto the ground. When the nuts 32 pile sufficiently high within the rear of hopper 24, the lower layer 16 of stick removal screen 18 begins to gently bump the top nuts 32 toward the front end 34 of hopper 24. The operator of the nut harvester can tell when harvest trailer is full and needs to be unloaded by looking through viewing screen 44 in the front end 34 of hopper 24. In order to provide additional clearance between cross bars 64 of stick removal screen 18 and a pile of nuts 32 within hopper 24 being pushed forward by cross bars 64 of stick removal screen 18, short extensions or paddles may be attached to every forth or fifth cross bar 64. These short extensions serve to completely clear an area between the top of the pile of nuts 32 and the stick removal screen 18 for the nuts 32 to fall into under very high volume loading of hopper 24. The short extensions are considered to be cross bars 64 of a different size and shape.

It should be noted that I have also built my harvest trailer 10 in a manner where receiver opening 94 was at the front end 34 of hopper 24 with solid panel 12 placed more toward the rear end 38 of hopper 24. With this structuring, the rotational direction of stick removal screen 18 is reversed to have upper layer 14 of screen 18 move toward front end 34 of hopper 24, and lower layer 16 of screen 18 move toward rear end 36 of hopper 24. When this structuring is used, the mixture of nuts 32 and sticks 72 are dumped onto upper layer 14 of screen 18 rearward of receiver opening 94 and moved toward front end 34 of hopper 24 where nuts 32 fall into hopper 24 and sticks 72 are dumped off front end 34 of hopper 24 onto the ground. This reverse movement of moving the mixture of nuts 32 and sticks 72 from more rearward to the front of hopper 24 functions suitably well, however, moving the mixture of nuts 32 and sticks 72 from front to rear of hopper 24 on screen 18 has been found to function even better due primarily to the length of travel, and the stick orienting effect of longer travel which causes more sticks 72 to lay horizontally disposed, an effect of movement and inherent vibration of the moving stick removal screen 18.

It should also be noted I anticipate installing a stick collection bin on harvest trailer 10 to collect the discarded sticks 72 so they will not have to be dealt with in the next harvest year.

Although I have described and shown the invention of this disclosure in detail which should be more than adequate for those skilled in the art to both make and use my invention, I do not wish the scope of this patent to be less than the intended scope of the appended claims since those skilled in the art will recognize modifications from that of the detailed structuring of my harvest trailer 10 may and will be made.

I claim:

1. A harvest trailer with stick removing and harvested items leveling structure, comprising in combination; a frame having a tow hitch attached at one end thereof, and at least two wheels affixed to said frame to adapt said trailer for towing, said trailer having a hopper affixed to said frame, said hopper having at least one receiver opening positioned at a top end thereof to provide for loading harvested items therethrough into said hopper;

a generally continuous loop of screen movably affixed to said trailer, said loop of screen positioned over a portion of said top end of said hopper and further positioned over said at least one receiver opening of said hopper, said loop of screen extending generally from adjacent a front end of said hopper to adjacent an oppositely disposed rear end of said hopper over first rotatably support means, said loop of screen folded adjacent said front end of said hopper over second rotatable support means and again folded adjacent said rear end of said hopper to provide said generally continuous loop of screen, said loop of screen further positioned on said trailer to provide an upper layer of screen and a lower layer of screen positioned below said upper layer of screen, said lower layer of screen placed generally within an upper portion of said hopper positioned to strike sufficiently piled high said harvested items when said harvested items are contained within said hopper to level said harvested items;

means connected to said rotatably support means of powering rotational movement in said loop of screen whereby said upper layer of screen moves toward said rear end of said hopper simultaneously with said lower layer of screen moving toward said front end of said hopper;

a generally solid panel affixed via mounting means to said trailer between said upper layer of screen and said lower layer of screen, said solid panel extending generally from said front end of said hopper toward said rear end of said hopper whereat said panel terminates adjacent and in spaced apart relationship to said rear end of said hopper to provide said at least one receiver opening at said top end of said hopper whereby the harvested items are deposited into the hopper and the sticks are removed from the upper layer of screen;

means affixed to said trailer adapted to provided for unloading of said harvested items when contained within said hopper.

2. A harvest trailer with stick removing and harvested items leveling structure, comprising in combination; a frame having at least one two hitch attached to at least one end thereof, and at least two wheels affixed to said frame to adapt said trailer for towing, said trailer having a hopper affixed to said frame, said hopper having at least one receiver opening positioned at a top end thereof to provide for loading harvested items therethrough into said hopper;

a generally continuous loop of screen movably affixed to said trailer, said loop of screen positioned over a portion of said top end of said hopper and further positioned over said at least one receiver opening of said hopper, said loop of screen extending generally to adjacent a rear end of said hopper, said loop of screen generally folded twice and supported by a first rotatable support means and a second rotatable support means to provide said generally continuous loop of screen, said loop of screen further positioned on said trailer to provide an upper layer of screen and a lower layer of screen positioned below said upper layer of screen, said lower layer of screen placed generally within an upper portion of said hopper positioned to strike sufficiently piled high said harvested items when said harvested items are contained within said hopper to level said harvested items;

means connected to said rotatable support means of powering rotational movement in said loop of screen whereby said upper layer of screen moves toward said rear end of said hopper simultaneously with said lower layer of screen moving toward an oppositely disposed front end of said hopper;

a generally solid panel affixed via mounting means to said trailer between said upper layer of screen and said lower layer of screen, said solid panel extending generally from a front end of said loop of screen toward an oppositely disposed rear end of said loop of screen whereat said panel terminates adjacent and in spaced apart relationship to said rear end of said hopper and said rear end of said loop of screen to provide said at least one receiver opening at said top end of said hopper whereby the harvested items are deposited into the hopper and the sticks are removed from the upper layer of screen.

3. A trailer with debris removing and harvested items leveling structure, comprising in combination; a frame having at least one tow hitch attached to at least one end thereof, and at least two wheels affixed to said frame to adapt said trailer for towing, said trailer having a hopper affixed to said frame, said hopper having at least one receiver opening positioned at a top end thereof to provide for loading harvested items therethrough into said hopper;

a generally continuous loop of screen movably affixed to said trailer, said loop of screen positioned generally over a portion of said top end of said hopper and further positioned over said at least one receiver opening of said hopper, said loop of screen extending generally to a debris off load position, said loop of screen generally folded twice and supported by a first rotatable support means and a second rotatably support means to provide said generally continuous loop of screen, said loop of screen further positioned on said trailer to provide an upper layer of screen and a lower layer of screen positioned below said upper layer of screen, said lower layer of screen placed generally within an upper portion of said hopper positioned to strike sufficiently piled high said harvested items when said harvested items are contained within said hopper to level said harvested items;

means connected to said rotatable support means of powering rotational movement in said loop of screen whereby said upper layer of screen moves in one direction toward said debris off load position simultaneously with said lower layer of screen moving in an opposite direction;

a generally solid panel affixed via mounting means to said trailer between said upper layer of screen and said lower layer of screen, said solid panel extending generally from one end of said loop of screen toward an oppositely disposed end of said loop of screen whereat said panel terminates adjacent and in spaced apart relationship to said oppositely disposed end of said loop of screen and said debris off load position to provide said at least one receiver opening at said top end of said hopper whereby the harvested items are deposited into the hopper and the sticks are removed from the upper layer of screen.

* * * * *